(12) United States Patent
Kupfer et al.

(10) Patent No.: US 7,348,525 B2
(45) Date of Patent: Mar. 25, 2008

(54) SEALING JAW

(75) Inventors: Reinhard Kupfer, Mainz (DE); Roland Palmqvist, Akarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/532,437

(22) PCT Filed: Sep. 19, 2003

(86) PCT No.: PCT/EP03/10452

§ 371 (c)(1), (2), (4) Date: Dec. 22, 2005

(87) PCT Pub. No.: WO2004/037651

PCT Pub. Date: May 6, 2004

(65) Prior Publication Data

US 2006/0124626 A1    Jun. 15, 2006

(30) Foreign Application Priority Data

Oct. 24, 2002    (EP) .................................. 02023851

(51) Int. Cl.
H05B 6/10    (2006.01)
A01J 21/00    (2006.01)
(52) U.S. Cl. ...................................... 219/633; 425/408
(58) Field of Classification Search ................ 219/633, 219/603, 604, 607, 606; 53/463, 373.7, 477; 425/406, 408, 412, 419
See application file for complete search history.

(56) References Cited

U.S. PATENT DOCUMENTS 3,549,440 A    12/1970    Adcock et al. ................ 156/69
4,704,509 A *  11/1987    Hilmersson et al. ......... 219/633
5,208,083 A *  5/1993     Freed .......................... 428/36.7
5,678,392 A *  10/1997    Konno .......................... 53/477
5,787,690 A *  8/1998     Konno .......................... 53/550
5,953,884 A *  9/1999     Lawecki et al. ............... 53/428
6,167,681 B1 * 1/2001     Yano et al. .................... 53/477
6,216,420 B1 * 4/2001     Mazzetto et al. ........... 53/373.7
6,337,471 B1 * 1/2002     Kistner et al. ............... 219/633
6,725,634 B1 * 4/2004     Palmqvist et al. ............. 53/548
2003/0058320 A1* 3/2003   Sano et al. .................. 347/103

FOREIGN PATENT DOCUMENTS

EP    0484998 B1    8/1994
EP    0936150 B1    4/2004
WO    WO 00/44625   8/2000

\* cited by examiner

Primary Examiner—Daniel Robinson
(74) Attorney, Agent, or Firm—Michael L. Dunn

(57) ABSTRACT

A sealing jaw for manufacturing a sealing seam in a heat-sealable packaging material. The invention furthermore relates to an induction sealing device with a sealing jaw and to a packaging machine with induction sealing device. In order to provide a sealing jaw with which a sealed and durable sealing seam can be produced, even when solid components of the in-filled product are trapped between the jaws that have to be moved towards one another, a sealing jaw is proposed with means of a sealing jaw with a sealing surface that is provided in order to come into contact with the heat-sealable material, and a rod or bar-shaped heating device that is provided in order to heat up the heat-sealable material, wherein a pressure element is provided on the sealing surface, projecting above said sealing surface, and distanced from the heating device.

14 Claims, 6 Drawing Sheets

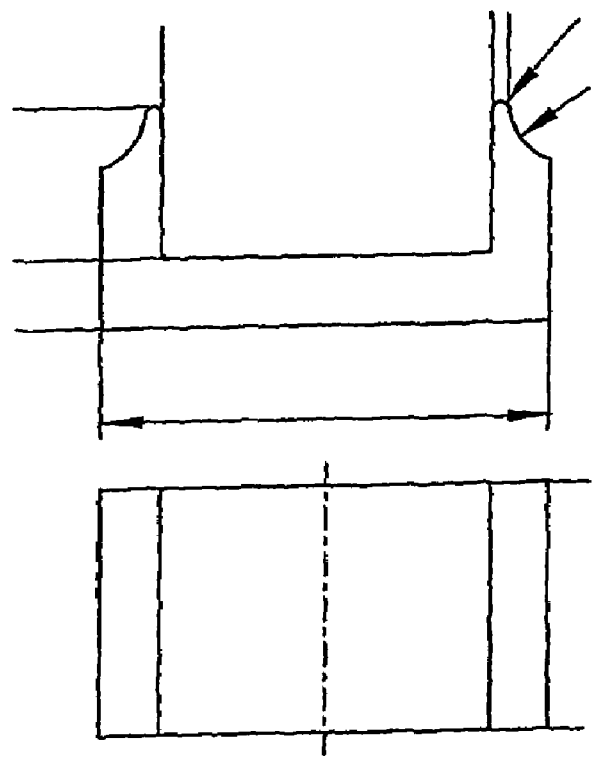
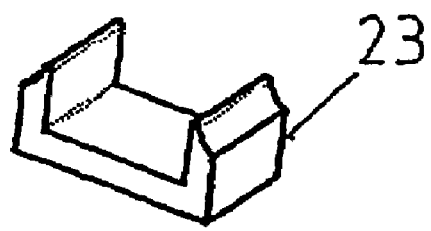
Fig. 5

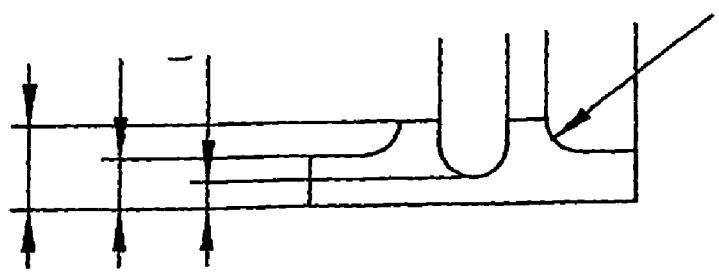
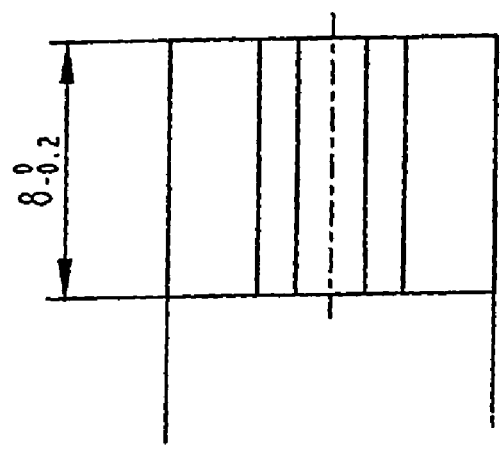
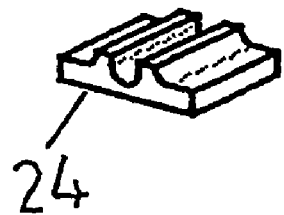
Fig. 6

SEALING JAW

BACKGROUND OF THE INVENTION

The present invention relates to a sealing jaw for manufacturing a sealing seam in a heat-sealable packaging material. The invention furthermore relates to an induction sealing device with a sealing jaw and to a packaging machine with induction sealing device.

Many flowable food products such as, for example, fruit juice, pasteurised or UHT milk, wine, tomato sauce and so forth are purchased in packages that are manufactured from sterilised packaging material.

Cuboidal milk packages are known that are formed by folding and sealing laminated packaging material with a multi-layered structure that has a fibrous layer, for example, paper, that is covered on both sides with layers of heat-sealable plastics material, for example, polyethylene. In many applications, in particular in the case of sterile packages of products with very long shelf-life such as, for example, orange juice or tomato sauce, a packaging material is generally used that has a barrier layer, for example, an aluminium layer, that is applied to a layer of heat-sealable plastics material, and is itself in turn covered with another layer of heat-sealable plastics material.

Such packages are typically manufactured and filled on fully automated tubular bag packaging machines. The packaging material web is sterilised in the packaging machine, for example, by the application of a chemical sterilising agent such as, for example, a hydrogen peroxide solution. The chemical sterilising agent is removed after sterilising. This can be done, for example, by vaporising the agent by heating the surface of the web. The sterilised packaging material is then kept in a closed, sterile environment and is folded and sealed in the longitudinal direction in order to form a continuous tubular bag.

This tubular bag is moved continuously in a first, usually vertical direction, is filled with the sterilised or sterile processed foodstuffs, and is then gripped by two pairs of jaws that heat and press the packaging material so that surface melting of adjacent thermoplastic layers is obtained in order to produce a fluid-tight weld. This right-angle weld is frequently also referred to as a right-angle sealing seam. For welding or sealing in this manner, so-called heating or sealing jaws are usually used that receive the packaging material to be sealed in between them and can press together at the same time as being heated, such that they melt the plastics layers that are pressed together between the sealing jaws and are lying beside one another, and form a sealed and thus a mechanically strong weld point. The pair of jaws can be formed either by two sealing jaws that both have a respective heating device, or just a single sealing jaw can be used that is pressed against a counter-jaw that serves as a thrust bearing.

Sealing jaws are often used that have thin metal strips that are arranged on an insulating material, usually a ceramic material. In order to heat the metal strips, a short current pulse is conducted through the strips, which are thereby very rapidly heated to high temperatures. The heat generated in the metallic strips is transferred to the packaging material because of the direct contact connection, so because of the pressure that is exerted by the pair of jaws, layers of packaging that touch are fused together.

The sealing jaws usually have two approximately parallel heating strips that produce two corresponding right-angle sealing seams, so with the aid of a cutting or separating device, the packaging material can be separated between the two right-angle sealing seams in order to obtain individual, sealed packages.

As described hereinabove, the section of the packaging tube that is clamped between the pair of jaws is melted by the heating device attached to at least one of the jaws, so the two layers of heat-sealable plastics material that are held firmly between the jaws melt locally.

Where a packaging material is used with an electrically conductive layer such as, for example, aluminium, the packaging material can also be sealed by using a so-called induction heating process wherein when the tube is pressed together by the jaws, an eddy current is induced in the aluminium layer in order to locally heat the aluminium layer and thereby to locally melt the heat-sealable layers that are adjacent to the aluminium layer.

In these instances the heating device for the sealing jaw is formed by an inductor to which a high frequency voltage can be applied. The inductor is usually composed of one or more induction bars that are manufactured from electrically conductive material and extend parallel to the right-angle sealing seam to be produced. After the tubular packaging material has been clamped between the jaws fitted with inductors, an eddy current can be induced by means of the inductor in the tubular packaging material, and the material is heated to the necessary temperature for sealing. In this configuration, the other jaw usually does not have an inductor, but simply has pressure plates, usually of an elastomeric material, that cooperate with the induction bars.

Such a sealing jaw with an induction device is known, for example, from WO 00/20279.

When filling with flowable foodstuffs that contain small solid particles such as, for example, pips or fibres (of fruit pulp) it may happen that the solid particles are found between the jaws during melting of the right-angle sealing seam. This can lead to the right-angle sealing seam being less durable, or in the worst case even leaking from the outset. Such a faulty right-angle sealing seam is usually not noticed immediately during the packaging process, however. The leakage occurring is usually so slight that initially the packaged product does not leak from the package. Nevertheless, bacteria present in the environment go through the faulty right-angle sealing seam into the product. This can lead to fermentation and decay processes in food products, whereby the pressure within the package significantly increases and sooner or later the right-angle sealing seam bursts. Even when this affects only a proportion of less than 0.1% of packages using the conventional sealing procedure, a defective right-angle sealing seam can have considerable disadvantageous consequences, in particular, when as is often the case the completed packages are placed on pallets in large numbers. If a right-angle sealing seam is leaking, the contents of the faulty package leak over all the packages lying below it, so often even the undamaged packaged are virtually unsaleable because of their soiled outsides.

BRIEF DESCRIPTION OF THE INVENTION

The object of the present invention is therefore to provide a sealing jaw with which a sealed and durable sealing seam can be produced, even when solid components of the in-filled product are trapped between the jaws that have to be moved towards one another.

This object is solved according to the invention by means of a sealing jaw with a sealing surface that is provided in order to come into contact with the heat-sealable material, and a rod or bar-shaped heating device that is provided in order to heat up the heat-sealable material, wherein a pressure element is provided on the sealing surface, projecting above said sealing surface, and distanced from the heating device. By means of this additional pressure element it is ensured that solid components such as, for example, fruit pulp, possibly found in the area of the right-angle sealing seam, are reliably divided through. Moreover, by means of the additional pressure element, the heat sealed seam is somewhat wider at the place on which the pressure element is positioned, which itself results in a reliable and durable seam even when there are solids present in the right-angle sealing seam.

More particularly, the invention includes a sealing jaw for manufacturing a sealing seam in a heat-sealable material of a package with a sealing surface that is provided for coming into contact with the heat-sealable material, and a rod or bar-shaped heating device that is provided for heating the heat-sealable material, wherein a pressure element is provided on the sealing surface, projecting above the sealing surface and at a distance from the heating device.

BRIEF DESCRIPTION OF THE SEVERAL VIEWS OF THE DRAWINGS

FIG. 5a is a side view of a pressure element according to the invention.

FIG. 5b is a top view of the pressure element of FIG. 5a.

FIG. 5c is a perspective view of the pressure element of FIG. 5a.

FIG. 6a is a side view of a magnetic non-conductive insert.

FIG. 6b is a plan view of the insert of the insert of FIG. 6a, and

FIG. 6c is a perspective view of the insert of FIG. 6a.

DETAILED DESCRIPTION OF THE INVENTION

Figure 1:
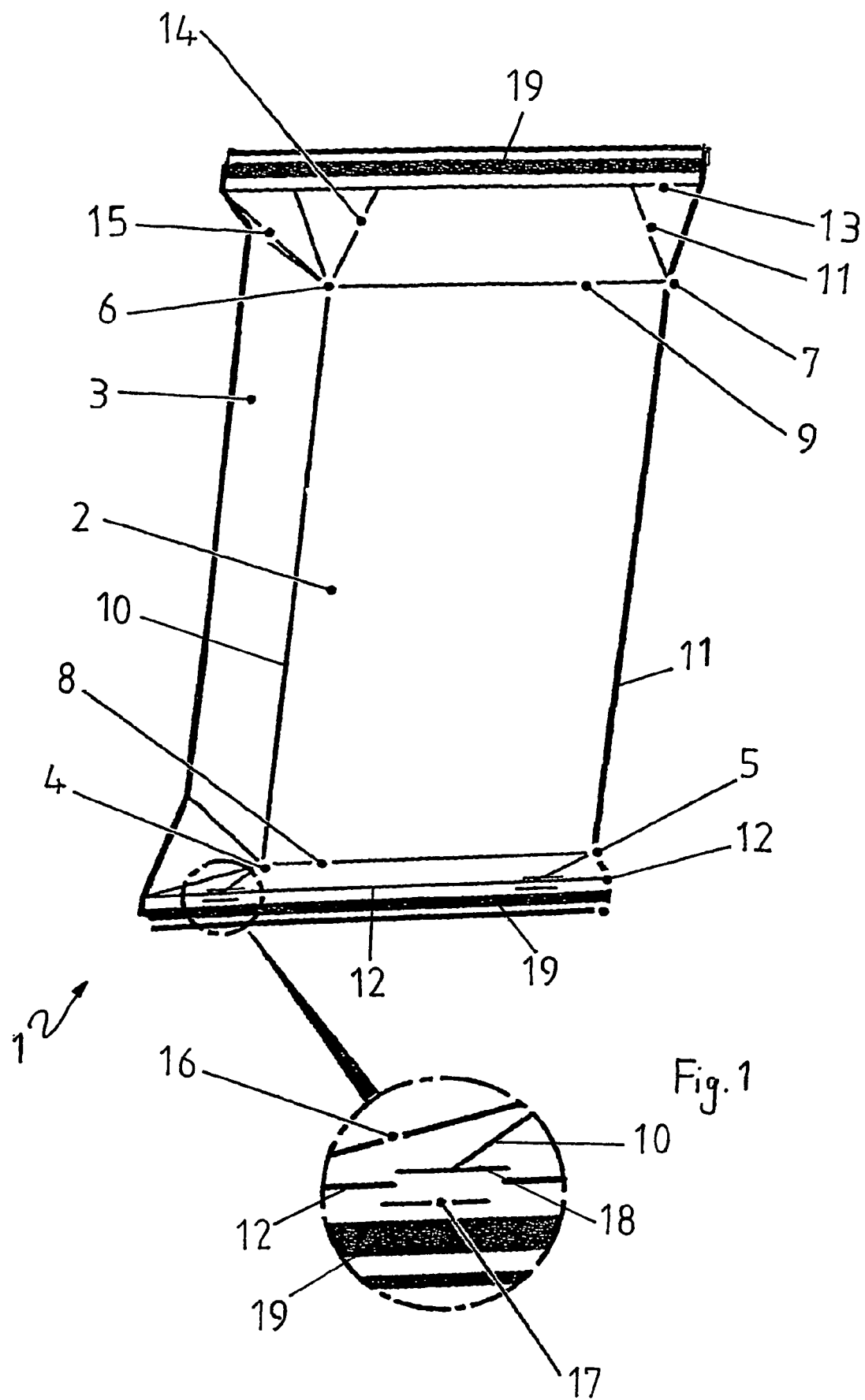
FIG. 1 shows a perspective view of a tubular bag package treated in accordance with the present invention.

It has been shown that the pressure element is advantageously also rod or bar-shaped and is arranged substantially parallel to the heating device. This results in strengthening over a whole section of the sealing seam, whereby the leakage rate can be further reduced.

In numerous tests, it has been established that preferably the heating device and the pressure element are distanced apart from one another by at least 0.1 mm, preferably between 0.25 mm and 3 mm, particularly preferably between 0.5 mm and 1.5 mm.

The heating device can be configured, in principle, in many different ways. It can thus be composed of a thin wire to which, if necessary, a direct current can be applied in order to briefly heat the wire to a high temperature. It has been shown, however, that when packaging material with an electrically conductive layer is used, it is particularly advantageous when the heating device is an inductor. In this case, a high voltage is applied to the inductor so that an eddy current can be induced in the electrically conductive layer of the packaging material, that in turn results in local heating of the corresponding heat-sealable layers. In this case, the pressure element should be composed of a non-conductive material. A particularly durable sealing seam is obtained when the pressure element is completely separate from the heating device, that is to say itself is neither heated nor induces an eddy current.

The pressure element is preferably composed of a very strong and very rigid material. For example, a ceramic material or a thermoplastic material can be considered. Polyaryletherketones, and particularly in this case polyetheretherketone (PEEK) have proved to be particularly suitable. Polyaryletherketones belong to those plastics that are very strong and very rigid in a broad temperature range. Advantageously, fibre-reinforced PEEK is used to which glass and/or plastics fibres, and possibly anti-friction additives such as PTFE and graphite are added. The materials described have proved particularly advantageous with respect to durability, and in particular with respect to the quality of the sealing seam to be produced.

It has been shown that the pressure element does not absolutely have to be arranged over the whole length of the heating device. In order to strengthen the sealing seam, instead a pressure element length of between 2 and 30 mm, preferably between 4 and 15 mm, particularly preferably between 7 and 9 mm, is advantageous. The length of the pressure element is measured parallel to the sealing seam to be produced.

Although the pair of jaws for producing the sealing seam is generally pressed together very rapidly, this nevertheless results in redistribution of the flowable product within the packaging tube. In particular shortly before touching the two packaging webs, because of the engagement of the jaws, the flow velocity in the region of the jaws increases considerably. By means of provision of the pressure element according to the invention, which projects over the sealing surface, an area is defined that has a smaller cross-section during closing of the jaws than the adjacent areas upon which no pressure element is arranged. This leads to an accelerated flowing away of solid components in the flowable product, so although the pressure element is not arranged along the whole heating device, the quality of the sealing seam can be increased still further.

The packaging webs used are usually provided with fold lines at which the packaging material is folded for producing the generally cuboidal package. Usually, longitudinal and right-angle fold lines are provided that form, inter alia, the right-angle and longitudinal edges of the cuboidal package in the case of the finished, filled and folded package.

Advantageously, the pressure element is substantially arranged such that it meets with the fold line running in the longitudinal direction when the packaging material is sealed, as the probability of a leak is at its greatest at this point.

In a particularly preferred embodiment, two pressure elements are provided that are preferably arranged such that during hot melting of the packaging material, they respectively meet on a fold line running in the longitudinal direction.

In order to manufacture the package, after the right-angle sealing seam has been manufactured it is generally folded over by 180°. The tabs produced are then bent over in the direction of the base surface of the package.

This, however, results in there being areas in the proximity of the fold lines where the packaging material is bent over by 180°. This can possibly lead to damage to the cellular material or barrier layer. It has therefore already been proposed in EP 0 936 150 to interrupt the fold lines in the areas that are bent by 180° when folded up together, and to replace them with two auxiliary fold lines slightly offset with respect to the actual fold line. The result of this is that the radius of bending is greater, and the danger of breaking the cellular material is minimised.

These auxiliary fold lines are, however, arranged in the direct proximity of the planned heat sealed seam. As the auxiliary fold lines of the packaging material used project slightly above the surface of the packaging material, in certain circumstances solid components in the product to be packaged can be clamped in during the sealing, so the sealing seam manufactured with the sealing units of the prior art do not produce a durable join. Tests have shown that in the case of leaky packages, the leak point is very often in the region of the auxiliary lines.

Thus, in accordance with the invention, the pressure element is arranged such that when the jaws are brought together it meets with the packaging material in the immediate environment of the double auxiliary line. By means of this measure, in the case of the packaging material described, the rejection rate due to defective right-angle sealing seams is clearly reduced.

It has been shown that the length of the pressure element advantageously corresponds to approximately the length of the auxiliary lines.

A further particularly advantageous embodiment of the sealing jaw proposes that two, rod or bar-shaped heating devices are provided. In this way two sealing seams can be produced at once. Advantageously a cutting or separating device, or at least an aperture for a cutting or separating device, is provided between the two heating devices. The welded packaging tube can be detached between the two right-angle seams using the cutting or separating device, in order to form individual packages.

Advantageously, at least one pressure element, preferably two pressure elements, is/are assigned to each heating device. As each heating device produces an individual heat sealing seam, by means of provision of the pressure element according to the invention, the quality of the heat sealing seam can be increased. If possible, the pressure elements should be arranged such that during hot melting all the pressure elements meet with fold lines running in the longitudinal direction, which are preferably embossed lines.

In a further, particularly advantageous embodiment, the ratio of the length of the heating device to the length of the pressure element is between 5:1 and 25:1, preferably between 10:1 and 20:1, particularly preferably approximately 15:1.

A further improvement in the sealing seam can be obtained in that the heating device is surrounded in a section by a layer of a magnetic material, and the pressure element is arranged in this section. By means of the magnetic material, the energy applied by the inductor to the electrically conductive packaging material layer is locally increased. This measure too results in the sealing seam widening somewhat, so in the area where the pressure element according to the invention is arranged, an extremely reliable and durable join occurs.

The magnetic material can be selected from a whole range of materials that amplify the induction effect. A non-conductive material is used particularly preferably in this case. For example, FERROTRON® can be used.

In a further, particularly preferred embodiment, the pressure element can be displaced or adjusted in the longitudinal direction of the sealing jaw. In this way one and the same sealing jaw can be optimally adjusted to different packages with differently arranged fold lines, so during coming into engagement with the packaging material, the pressure element meets with an embossed line running in the longitudinal direction.

The present invention also relates to an induction sealing device for heat-sealing packaging material. The present invention moreover also relates to a packaging machine wherein flowable materials are infilled into a tube formed from a web of packaging material provided with embossed lines, the tube is provided with a right angle seam in a sealing unit, and the tube is detached in the region of the right-angle sealing seam.

Further advantages, features and possibilities for application will be evident from the following description of a preferred embodiment, and from the attached drawings.

Figure 2:
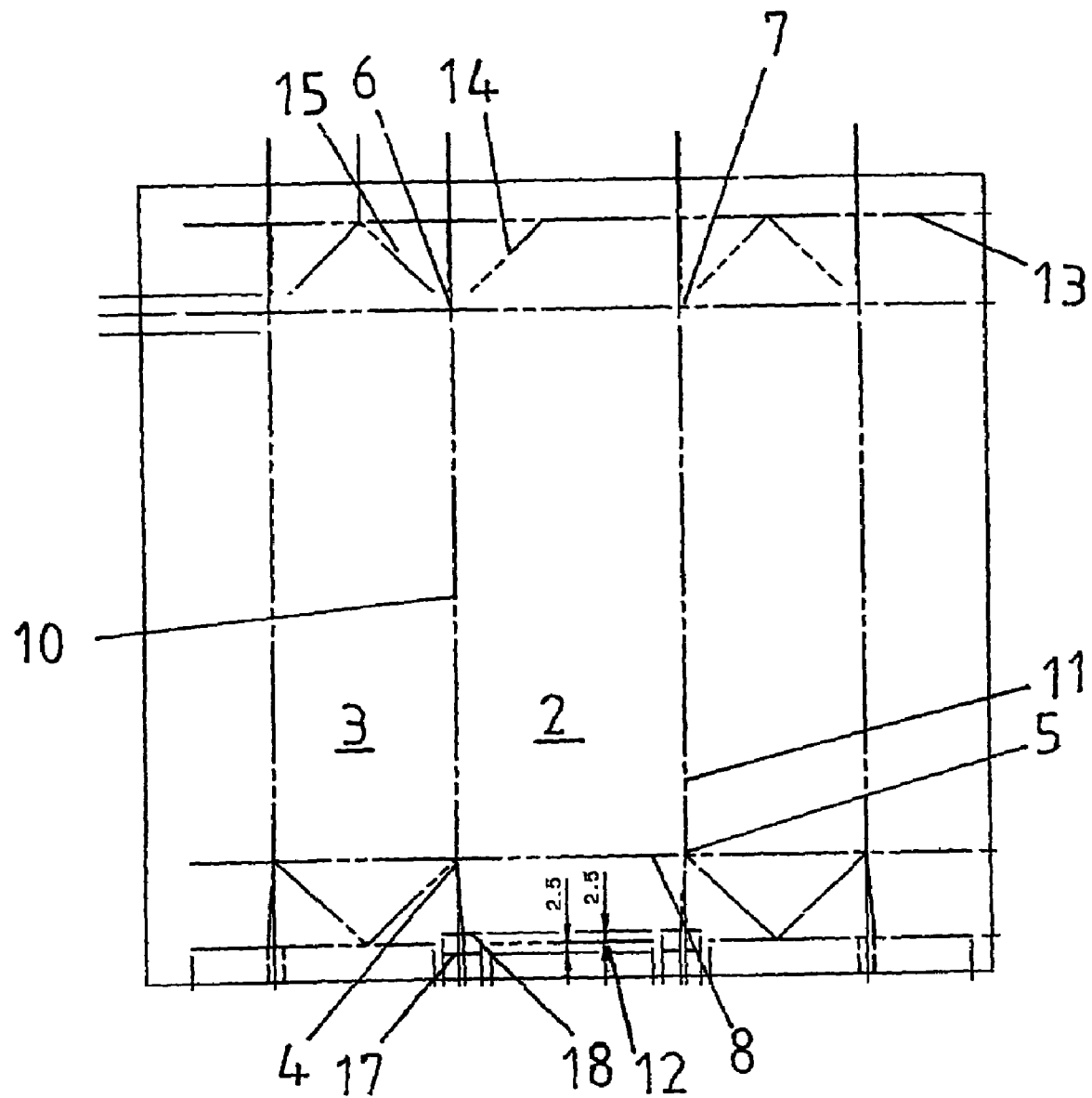
FIG. 2 shows a view of the packaging material for manufacturing the tubular bag package of FIG. 1, with fold lines indicated.

In FIG. 1 there is shown a known tubular bag package 1 as serves, for example, for receiving milk. In order to manufacture such a package, laminated packaging material in the form of a web with previously applied embossed fold lines, as is shown in FIG. 2, is supplied continuously to a packaging machine. The web is sterilised and then bent and sealed in the longitudinal direction so that it forms a tube or a pipe of packaging material. The sealing seam running in the longitudinal direction is not evident in FIG. 1, as it is located at the rear of the package.

The packaging tube forms an extension of the sterile chamber and is continuously filled with sterile or sterilely treated flowable food products. The tube sealed in the longitudinal direction is then clamped between pairs of sealing jaws, which seal the tube in the right angle direction. The right angle sealing seams have the reference numeral 19 in FIG. 1. For better understanding, in FIG. 1 and FIG. 2 the same positions and lines are provided with the same reference numerals. In FIG. 1, the front side 2 and the side wall 3 of the tubular bag package can be seen. Furthermore, the longitudinal edges 10 and 11 and the right angle edges 8 and 9 that delimit the front side 2 of the tubular bag package 1 are shown. The corresponding embossed lines are shown in FIG. 2. The front surface 2 is delimited by the corner points 4, 5, 6 and 7.

Furthermore, in FIGS. 1 and 2, the upper and lower end fold lines 13, 12 are shown. The tubular bag package is provided with a spout 15 and a pouring fold line 14. After the right-angle sealing seam 19 has been applied to the package 1 with the aid of the sealing jaws, the right-angle sealing seam is folded over along the line 12. This results in the packaging material being folded over in the region of the fold seam 12 by 180° in a first direction. In this way tensile stress is produced in the sterile material.

After the lower end of the package has been folded flat on the base of the package, the triangular tabs are also folded flat on the base. The material in the area shown enlarged in FIG. 1 is thus bent over a second time by 180° in a second direction. In order to somewhat reduce the material stress linked to this, often the lower embossed fold line 12 is interrupted in that in the area where the lower embossed fold line 12 and the side embossed fold line 10 would intersect, and instead two auxiliary embossed fold lines 17, 18 are applied that run parallel to one another, and are somewhat offset with respect to the lower end embossed fold line 12. This has the advantage that in this area, the radius of curvature is somewhat increased so that breakage of material can be effectively prevented.

All the embossed fold lines shown in FIG. 2 are, however, generally configured such that they form raised areas on the inside of the packaging material. In order to apply the right-angle sealing seams 19, the tube must be pressed together with the aid of appropriate jaws. The additional raised areas on the inside of the packaging material because of the auxiliary embossed fold lines 17, 18, layers of packaging material opposite one another touch initially at this point. It can thus happen that solid particles contained in the flowable food product to be infilled such as, for example, fruit pulp fibres or pips, are trapped between the embossed fold lines. If the right-angle sealing seam is then formed with the aid of a sealing unit, in certain circumstances the solid particles trapped between the auxiliary embossed fold lines can prevent a continuous right-angle sealing seam, which can involve the disadvantages described hereinabove.

A sealing jaw according to the invention, and parts thereof, are shown in FIGS. 3, 5*a*, 5*b* and 5*c*.

Figure 3:
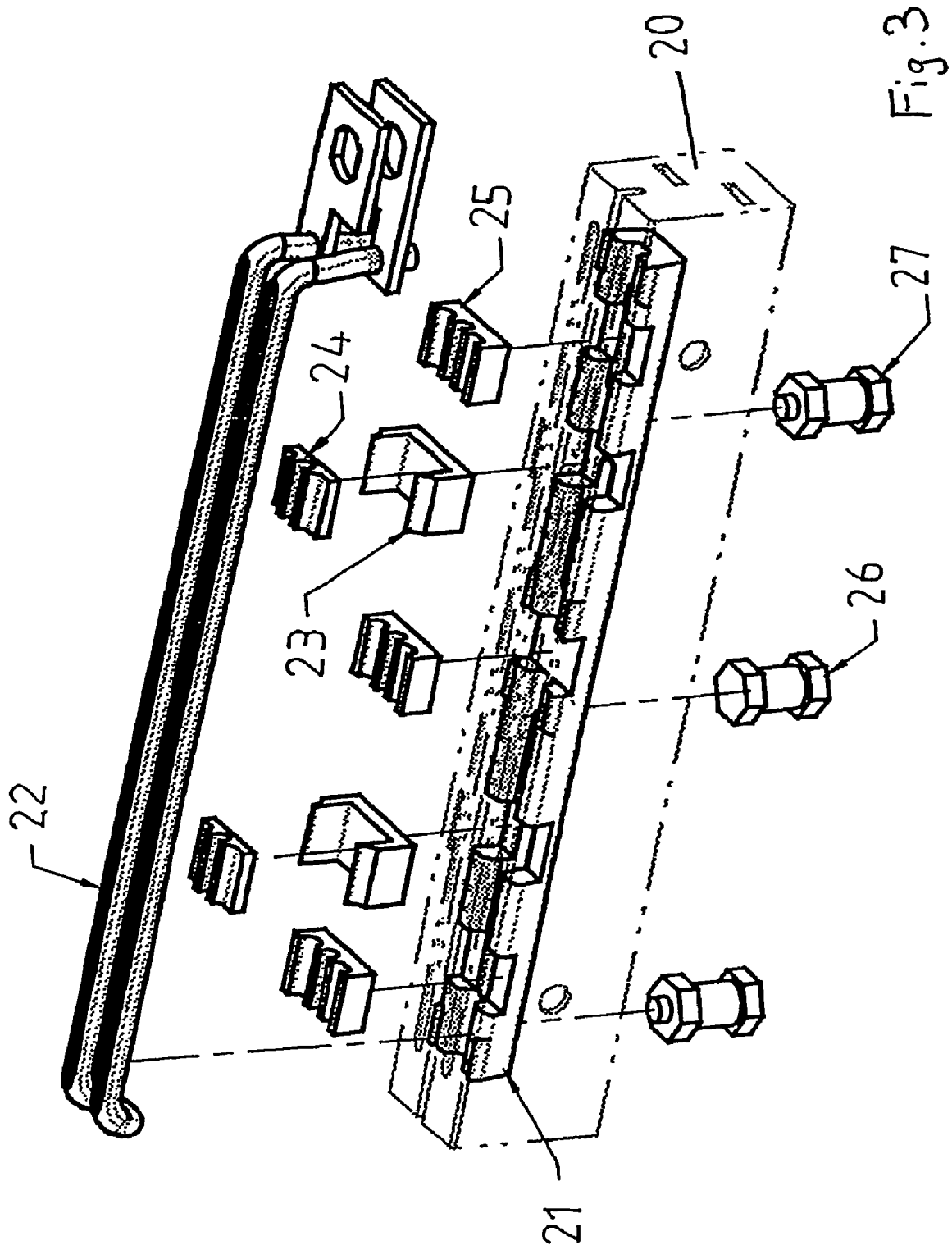
FIG. 3 is a view of the sealing jaw according to the invention in an exploded view.

FIG. 3 shows an embodiment of a sealing jaw in an exploded view. The sealing jaw body 20, which can be fitted to a holder with the aid of the screws 26, 27, is clearly evident. On the sealing jaw body 20 there is located a so-called core that serves to amplify the electromagnetic field generated by the inductor 22. The inductor 22 is composed of two rod-shaped electrical conductors joined to one another, with corresponding terminals. This inductor serves as a heating device. If a high voltage is applied to the inductor 22 at the electrical connection terminals 28, the electromagnetic alternating field generated by the inductor 22 is amplified by the core 21 and generates eddy currents in the electrically conductive layer of the packaging material, and thus heats this layer.

As the electrically conductive layer in the packaging material is usually very thin, heating of the packaging material is sufficient to melt the heat-sealable layers that surround the electrically conductive layer.

A ceramic insert 23 is furthermore shown that forms the pressure element according to the invention. The ceramic insert 23 that is shown in the three different views in FIGS. 5*a*, 5*b*, and 5*c*, has a substantially U-shaped cross-section and is arranged such that the two rod-shaped inductors are arranged between its two arms. The two tips of the U-shaped arms are configured such that they somewhat project above the surface of the sealing jaw body 20. They are therefore configured with rounded end faces as can be seen by the arrows at the top in FIG. 5*a*, in order to prevent damaging the packaging material during the clamping procedure.

The two arms of the U of the ceramic insert shown in FIGS. 3 and 5*a*, 5*b*, and 5*c*, each form a pressure element, both of which elements project above the sealing jaw body 20.

The pressure elements are arranged such that they come into contact with the packaging web in the area shown enlarged in FIG. 1. This is substantially the area in which the imaginary extension of the longitudinal embossed fold line intersects the extension of the lower end embossed fold line.

In addition, inserts 24 of FERROTRON® are shown. These inserts that are shown in three views, once again enlarged, in FIGS. 6*a*, 6*b*, and 6*c*, are of a non-conductive magnetic material and serve to amplify the electromagnetic alternating field generated by the inductor 22 locally in the immediate environment of the pressure element 23, so locally inducing greater energy in area shown enlarged in FIG. 1 and thereby a greater amount of heat is applied.

In FIG. 3 further inserts 25 of FERROTRON® are shown that are arranged on the ends of the inductor bars 22. These simply serve to amplify the field induced on the ends as the eddy current induced must inevitably be closed, so without using the FERROTRON inserts 25 in the area of the ends of the inductor rods, somewhat less magnetic energy would be induced in the packaging web.

Figure 4:
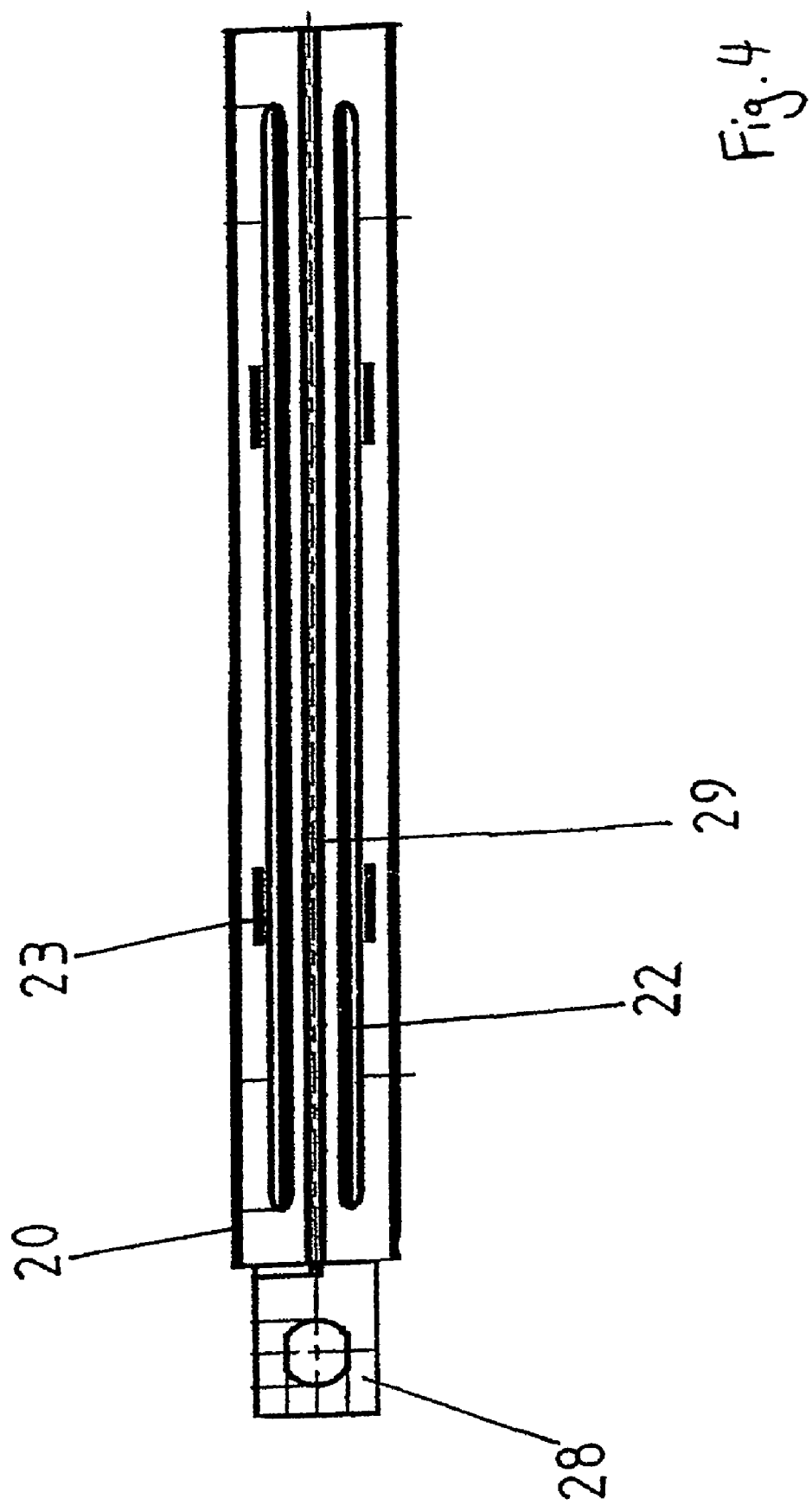
FIG. 4 is a plan view of the sealing jaw according to the invention of FIG. 3.

FIG. 4 shows a plan view of the sealing surface of the sealing jaw according to the invention. The inductor 22 is clearly evident, which is received in the sealing jaw body 20 with its connector 28. Also evident are the pressure elements 23, two of which are arranged on each side of the inductor rods 22.

The sealing jaw body 20 has a recess 29 between the two inductor rods 22 that is provided to receive a separating or cutting device in order to cut off the packaging tube between the two right angle sealing seams formed by the inductor rods 22.

LIST OF DESIGNATIONS 1. tubular bag package
2. large side wall panel
3. small side wall panel
4. left, lower corner point
5. right, lower corner point
6. left, upper corner point
7. right, upper corner point
8. lower right-angle edge and lower right-angle fold line
9. upper right-angle edge and upper right-angle fold line
10. left longitudinal edge and left longitudinal fold line
11. right longitudinal edge and right longitudinal fold line
12. lower end fold line
13. upper end fold line
14. pouring fold line
15. upper tab fold line
16. lower tab fold line
17. upper auxiliary fold line
18. lower auxiliary fold line
19. right-angle sealing seam
20. sealing jaw body
21. core
22. inductor
23. pressure element
24/25. inserts
26/27. screws
28. electrical terminals
29. recess

What is claimed is:

1. A sealing jaw system comprising a sealing jaw, for manufacturing a transverse sealing seam (19) in the heat-sealable material for a package, where the heat sealable material has transverse crease lines 12 oriented in a direction that insects longitudinal crease lines 10, said transverse crease lines being interrupted by gaps at a location where its direction passes a longitudinal crease line, and auxiliary crease lines 17, 18 extending parallel to the direction of the transverse crease lines at least along the gaps, said sealing jaw having a sealing surface that is provided for coming into contact with the heat-sealable material, and at least one rod or bar-shaped heating device is provided on the sealing surface for heating the heat-sealable material, wherein at least one pressure element (23) is provided on the sealing surface, projecting above the sealing surface and at a distance from the heating device (22) and wherein the pressure element (23) is rod or bar shaped and extends substantially parallel to the heating device (22) and the pressure element (23) is adjustable for engagement with a fold line (10,11) running in a longitudinal direction relative to the pressure element and such that pressure element 23 extends along at least a portion of auxiliary crease lines 17, 18.

2. A sealing jaw system comprising a sealing jaw according to claim 1 wherein the heating device (22) and the pressure element (23) are distanced apart from one another by at least 0.1 mm.

3. A sealing jaw system comprising a sealing jaw according to claim 1 wherein the heating device (22) and the pressure element (23) are distanced apart from one another by between 0.25 mm and 3 mm.

4. A sealing jaw system comprising a sealing jaw according to claim 1 wherein the heating device (22) and the pressure element (23) are distanced apart from one another by between 0.5 mm and 1.5 mm.

5. A sealing jaw system comprising a sealing jaw according to claim 1 wherein the heating device (22) is provided with an inductor and the pressure element (23) is composed of a non-conductive material.

6. A sealing jaw system comprising a sealing jaw according to claim 1 wherein two pressure elements (23) are provided.

7. A sealing jaw system comprising a sealing jaw according to claim 1 wherein two rod or bar-shaped heating devices are provided.

8. A sealing jaw system comprising a sealing jaw according to claim 7, wherein a cutting or separating device is provided between the two heating devices.

9. A sealing jaw system comprising a sealing jaw according to claim 7, wherein an aperture for a cutting or separating device is provided between the two heating devices.

10. A sealing jaw system comprising a sealing jaw according to claim 1, wherein each heating device is allocated at least one pressure element (23).

11. A sealing jaw system comprising a sealing jaw according to claim 1, wherein the ratio of the length of the heating device to the length of the pressure element (23) is between 5:1 and 25:1.

12. A sealing jaw system comprising a sealing jaw according to claim 1, wherein the pressure element (23) can be displaced in a longitudinal direction of the sealing jaw.

13. A sealing jaw system comprising a sealing jaw according to claim 5 comprising a counter jaw for producing sealing seam by pressing and heating heat-sealable packaging material between the sealing jaw and a counter jaw.

14. Use of a sealing jaw system according to claim 13 in which flowable material is infilled into a tube (1) formed from a material web of packaging material provided with fold lines (12, 13), where the tube (1) is provided with a right-angle sealing seam (19) by pressing and heating heat-sealable packaging material between the sealing jaw and the counter jaw and the sealing jaw system is further provided with a device for detaching the tube from the web in the area of the right-angle sealing seam (19).

* * * * *